United States Patent Office

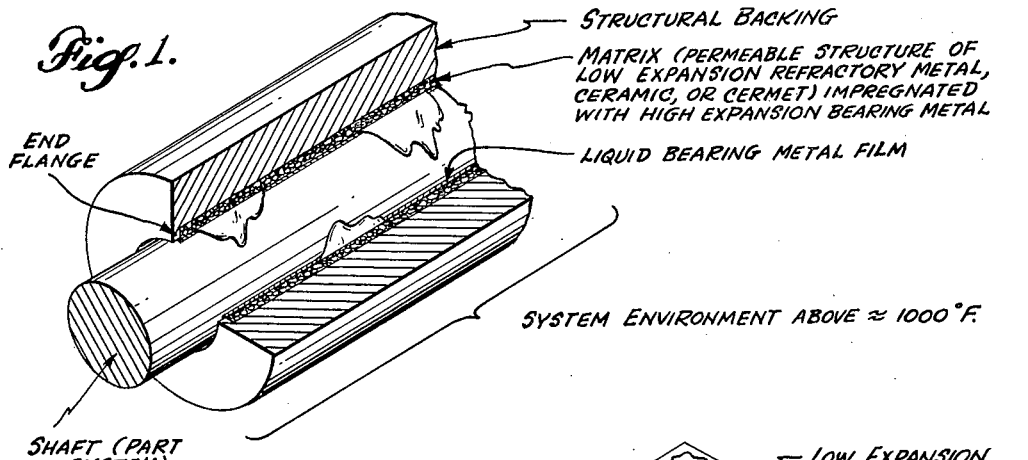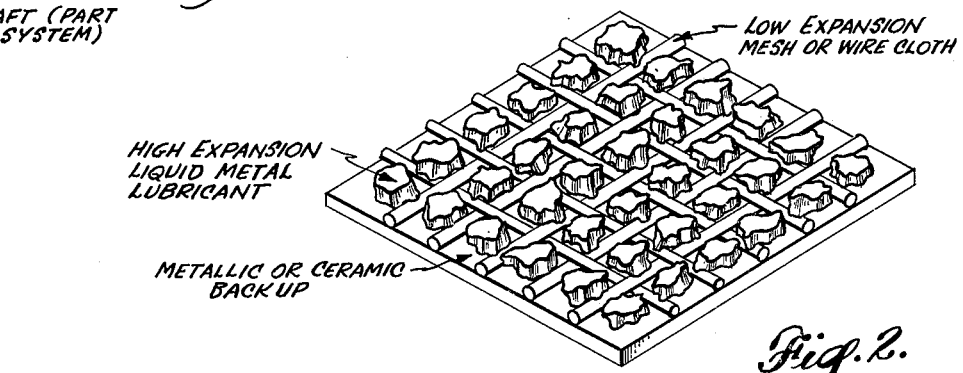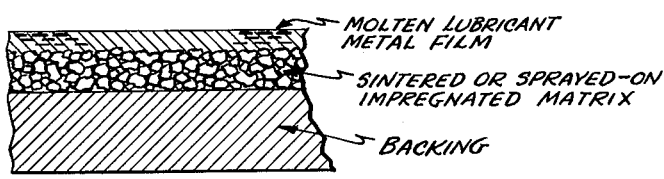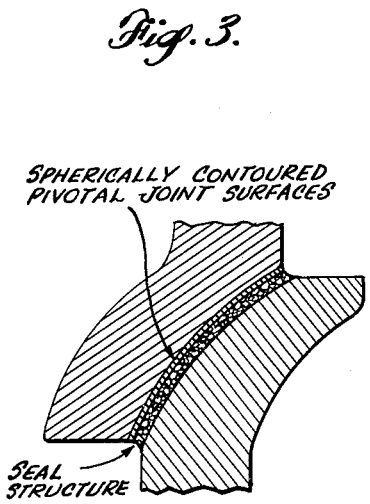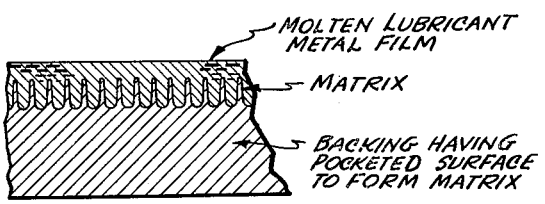

3,206,264
Patented Sept. 14, 1965

3,206,264
HIGH TEMPERATURE BEARINGS
Larry B. Dalzell, Seattle, and Jan W. Van Wyk, Bellevue, Wash., assignors to Boeing Airplane Company, Seattle, Wash., a corporation of Delaware
Filed Aug. 12, 1960, Ser. No. 49,377
4 Claims. (Cl. 308—240)

This invention relates to improvements in bearing structures and seals for operation at high temperatures such as in the range above approximately 1000° F. The invention is herein illustratively described by reference to the presently preferred means for practicing the same; however, it will be recognized that certain modifications and changes therein with respect to details may be made without departing from the underlying essentials involved.

Among the advancements in bearing technology in recent years is the development of impregnated matrix bearings. Usually these comprise sintered metal forms impregnated with graphite, molybdenum sulfide, or various grease-type lubricants, and in some cases with solid lubricants such as polytetrafluoroethylene or Babbitt metals which operate on the principle of dry sliding friction. In such cases the bearing matrix comprises a relatively hard substance and the surface film material comprises a low shear strength solid which forms the bearing surface and lubricating material. Another bearing comprises a steel outer shell or jacket to the interior of which is bonded a copper matrix having a knurled pattern which grips the filler of bearing alloy such as a lead base babbit; again a dry sliding friction bearing.

The term "bearing" as used herein is intended to include not only bearings as such but also low-friction seals, which may or may not serve a primary bearing function.

However, these and other existing or proposed bearings were limited to relatively low-temperature operation, i.e., below approximately 1000° F., and are therefore unsuitable for hypersonic reentry vehicles, rocket nozzle joints, kiln car bearings and other applications involving temperatures often well above 1000° F. and sometimes as high as 4000° F. or higher.

Accordingly, a broad object of the present invention is to provide a low-friction, low-wear, non-galling sliding-surface bearing structure and system capable of operating as an anti-friction load-supporting bearing and/or as a seal in the indicated high-temperature ranges.

A further object of the invention is to provide a compact and inexpensive high-temperature bearing which employs a film of molten metal as a lubricant and as loadable cushion between relatively movable surfaces, and which provides and maintains such a film without necessity of separate pressurizing apparatus and connecting lines, as in certain prior proposals. In effect, the invention herein disclosed provides a self-contained and load and temperature accommodating source of molten metal lubricant.

In accordance with this invention, the novel composite bearing structure comprises a structural matrix which carries or is impregnated with a bearing metal which is in the liquid or molten state in the operating temperature range. A support member or backing on the matrix, which backing may or may not be required for additional structural strength, serves the function of containing or confining the liquid lubricant metal in the matrix and bearing interface. Surface tension of the molten lubricant metal causes it to be retained by the many surfaces and corners or pockets of the matrix so as to be presented to an opposing lubricated surface disposed in sliding contact with the exposed face of the matrix. A further characterizing feature is the use of a lubricant metal which possesses a high thermal expansion coefficient, in conjunction with a matrix material of relatively low thermal expansion coefficient. Thus the lubricant metal, although retained by surface tension is forced out of the matrix pockets and interstices against the lubricated surface as a result of the differential expansion of matrix and lubricant material with rise of temperature into the operating range. A further characterizing feature is the choice of a matrix material and a lubricant metal which are mutually insoluble, that is, have a low rate of fusion, so that the solid matrix material does not enter into solution with the lubricant to cause increased wear and eventual galling of the bearing surface. With such a bearing structure a stable liquid metal film is maintained and retained at the bearing surface, which film is efficient both to lubricate and to bear load, which it does semi- or quasi-hydrostatically. In the operating temperature range, differential expansion which has occurred between the permeant lubricant metal and the supporting matrix results in expression or forcing of the liquified lubricant metal against the opposing load surface and thereby results in a pressure equilibrium by which lubricant metal is smeared uniformly over the bearing interface. In effect, the backed matrix serves as a self-contained, temperature and load accommodating reservoir for lubricant metal, and the differential expansion factor among others maintains an adequate bearing and lubricating film at the bearing interface at all times in the operating temperature range.

These and other features, objects and advantages of the invention will become fully evident from the following description thereof by reference to the accompanying drawings.

FIGURE 1 is a perspective view of a novel bearing structure supporting a shaft, with part of the bearing shown in cross section.

FIGURE 2 is a simplified enlarged perspective view of one embodiment of the bearing structure.

FIGURE 3 is a cross sectional view of a second embodiment.

FIGURE 4 is a cross sectional view of a third embodiment.

FIGURE 5 is a cross section illustrating application of the invention to a bearing (or seal) structure in a spherically contoured pivoted joint, such as may be required in a rocket nozzle.

In order to minimize the actuating forces, and thereby reduce the bulk, weight and cost of actuators required for operating control surfaces and the like in hypersonic reentry aircraft, nozzle parts in rocket engines, or any of various other high-temperature devices, low-friction bearings are essential which will be capable of standing up under operating environments wholly destructive to conventional bearings. For instance, at temperatures above about 1000° F. graphite, molybdenum sulfide, greases, oils, polytetrafluoroethylene and other conventional lubricants sublimate, decompose or otherwise deteriorate rapidly. Moreover, above its melting point babbitt or like bearing metals in an ordinary dry sliding type bearing would run out from between the opposing parts at the bearing interface and galling would soon occur. It was therefore evident that the solution to the high-temperature bearing problem by mere modification or refinement of conventional bearing structures was impracticable since the required extension of safe operating temperature capability usually involved a several-fold increase.

A specific characteristic of the present bearing structures is the provision of molten metal lubricant cushion or support film at the bearing interface, such lubricant being supplied and maintained by a self-contained reservoir which is load and temperature accommodating. This reservoir takes the form of a special bearing matrix having a backing which serves to contain the lubricant in the matrix and imparts structural strength and a means of support. The matrix material is chosen to possess a low thermal expansion coefficient and the molten lubricant to possess a relatively high thermal expansion coefficient. It is desirable but not always possible to choose a bearing metal having a coefficient of the order of four or five times that of the matrix material. If the bearing environment is non-oxidizing, thallium may be used as the bearing metal. In that event, an example of a suitable matrix material is aluminum oxide, having a thermal expansion coefficient of approximately $8.0 \times 10^{-6}$ cm./cm./° C., whereas thallium, as the lubricant metal, has a thermal expansion coefficient of approximately $38 \times 10^{-6}$ cm./cm./° C. The difference between thermal expansion characteristics of the two materials chosen should be as high as possible for optimum bearing performance following the principles of the invention.

Another condition to be observed in this unique type of bearing is that the molten lubricant metal should not receive into solution by fusion any appreciable quantity of the matrix or backing material. Serious galling at the bearing interface can occur if the lubricant metal and structural material form solid solutions. Also, the bearing should not be operated at temperatures equal to or exceeding the softening point of the matrix material, whereas the permeant metal lubricant should be selected to have a melting point which is low enough to insure complete liquidation at the operating temperature of the bearing surface.

From the foregoing and related considerations it will be recognized that arbitrary combinations of matrix material and permeant lubricant metal should not be attempted, but that the selection of a particular liquid metal lubricant should be made dependent upon the choice of a specific structural or matrix material for the bearing.

Materials which may be used for the matrix and backing roles may be listed, without limitation, as follows: In the class of refractory metals; columbium, molybdenum, tantalum and tungsten. In the class of ceramic oxides; alumina, hafnia, zirconia, beryllia, thoria and spinels. In the class of refractory hard metals; nitrides, silicides, carbides and borides. In the class of metal alloys; steel, super-alloys, alloys of metals listed in the refactory metal group above. Furthermore cermets (i.e., combinations of ceramic substances and metals, produced by plasma-arc spray techniques or other known processes) may be used to advantage.

Careful analysis of the various characteristics of these materials indicates that with a number of low melting point, high thermal expansion type lubricant metals which may be used as the bearing contact material, a matrix of ceramic materials, and particularly ceramic oxides, will possess unique advantages for purposes of the invention. Particularly is this true for various applications of extremely high temperatures when stress conditions and envelope diameters must be seriously considered. By impregnating a matrix of a ceramic oxide, for example, with a high expansion liquid metal, such as silver, gold, platinum, indium, or gold-silicon alloy (96 Au–4 Si), to name what are presently considered to be the preferred choices, bearing structures are attainable efficient to temperatures of the order of a few thousand degrees Fahrenheit, limited primarily by the softening point of the matrix and backing material. For relatively low temperatures Wood's metal or other low melting point metals and alloys may be used with appropriate matrix materials.

It is desired that the lubricant possess certain distinctive properties. It should have a low viscosity or low shear strength over the entire operational temperature range, and low weldability or solid solution tendency with relation to the mating surface materials. Furthermore, it should possess a high coefficient of expansion compared with that of the structural material in the bearing. It must also possess chemical stability at elevated temperatures and must be completely molten in the intended operational temperature range.

It is also desirable that the lubricant metal be capable of wetting the surfaces of the matrix which serves as the reservoir, so that uniform distribution of permeant metal in the matrix will be assured. This is desirable so that when temperature rises there will be a uniform distribution of pressure, due to thermal expansion of the lubricant metal, throughout all of the surface area of the bearing and therefore uniform load distribution and wear at the interface. The expansion capability of the permeant metal beyond that of the matrix and backing material assures the continued maintenance of a supporting, lubricating film at the interface in the operating temperature range wherein the lubricant metal is molten. Surface tension and wetting charcteristics of the molten metal in relation to the matrix surfaces tend to retain the lubricant within the bearing system.

In some cases cold clearances between parts at the interface may be indicated, in excess of clearances needed in the operating temperature range. This and related design factors may be readily calculable or may require empirical determination in some instances, depending upon choice of combinations of materials in the bearing structure, as well as the nature of the supported shaft or other part supporting or supported by the bearing.

In FIGURE 1 a typical annular bearing structure supporting a shaft is depicted, wherein the matrix is in the form of a sleeve adhered to the internal surface of a separate backing sleeve or ring. In this illustration the matrix comprises a relatively thin liner within the backing sleeve, which in this instance comprises the principal structural bearing element. The backing has end flanges which extend radially inward to a location just out of contact with the shaft. These end flanges, or other appropriate sealing at the ends of the matrix reduce any tendency for liquid lubricant metal to escape. However, surface tension of the lubricant reacting from the matrix structure inherently holds the lubricant at the interface to a major extent, so that such end-closure provisions may in certain cases be of questionable importance.

There are various techniques by which bearing structures according to this invention may be manufactured. In FIGURE 2 the technique disclosed is that of bonding a wire screen or cloth to a backing plate or surface and impregnating the interstices and mesh openings of the cloth or screen with the high expansion lubricant metal. The metallic or ceramic backing may be of any desired thickness, shape or size, and the metal screen or cloth may be of any suitable gauge or wire thickness. It may be of ceramic material, if desired, or of a cermet, but with a matrix of this form (i.e., screen or mesh) is preferably of a refractory metal, metal alloy or hard metal selected, for example, from the groups listed above.

In FIGURE 3 the matrix comprises a sintered deposit on a structural backing. The sintered layer comprises a mass of compressed metal particles suitably baked according to any of the known or applicable sintering processes, and the molten lubricant metal is then impregnated into the pores and interstices of the sintered layer.

In FIGURE 4 the matrix comprises the pocketed surface of the structural backing itself, the lubricant metal being applied so as to impregnate the pockets and openings in the structural backing surface to serve as the lubricant reservoir.

Other manufacturing methods may also be used, such as the plasma-arc spray process in which molten metals or ceramic materials are ejected in a combined stream and deposited on a receiving mandrel. For example, in such a process the backing, the lubricant and the matrix may be applied by a single spraying device. Thus on one side of the deposit the ceramic or refractory material which is to serve as the matrix and backing is cut off from the sprayed discharge so as to leave a final surface layer of lubricant metal, whereas in terminating the process on the opposite side of the deposit, the lubricant metal is cut off from the discharge and the required thickness of solid backing material is deposited. The intervening body of material comprises the lubricant metal impregnated matrix which becomes porous as the lubricant expands and works its way to the bearing surface during rise of temperature.

Alternatively, the impregnation of a bearing matrix may be accomplished by saturation of the matrix with a solution carrying the desired lubricant metal, for instance, a solution of $AgNO_3$, drying, baking the part at elevated temperature in order to decompose the dried solution and thereby leaving the lubricant metal as a deposit in the pores. Instead of any of these techniques, the impregnation may occur by dipping the porous material matrix into a molten pool of the desired lubricant metal, or by using an electrodeposition or vapor deposition process.

In the process involving pressing and sintering of matrix particles into a structural mass, it may be desirable, in order to insure open porosity, that burn-out material particles be incorporated, which upon completion of the formed product are eliminated by elevating the temperature so as to decompose and eliminate the burn-out material and thereby form the desired pore spaces. Thereupon impregnation with lubricant metal is accomplished by any of the techniques indicated. Photoetching, machining or scoring of a backing surface, drilling and still other techniques are also available for producing the combined backing and matrix form illustrated in FIGURE 4.

These and other aspects of the invention will be evident to those skilled in the art on the basis of the foregoing description of the preferred practices thereof.

We claim as our invention:

1. A composite bearing structure for use at high temperatures comprising a support member, a matrix having a first coefficient of thermal expansion and being retained by said support member, said matrix having a bearing surface with a large number of pockets therein, and a lubricant metal having a second coefficient of thermal expansion substantially greater than said first coefficient of thermal expansion and being located within the pockets of the bearing surface, said lubricant metal having a predetermined minimum melting point and having the property of wetting said matrix, whereby an increase in the bearing temperature to the predetermined melting point causes the lubricant metal to liquify and the difference in coefficients of thermal expansion causes the liquid lubricant metal to expand more rapidly than the matrix and be forced partially out of the matrix pockets to serve as a lubricant on the bearing surface which it wets to produce a uniform distribution of the lubricant metal in the matrix and over the bearing surface thereof.

2. The bearing structure according to claim 1 wherein said matrix comprises a material having a low fusion rate with respect to the liquid lubricant metal.

3. The bearing structure according to claim 1 wherein said matrix is composed of a material selected from the group of ceramic oxides consisting of alumina, hafnia, zirconia, beryllia, thoria, and spinels.

4. The bearing structure according to claim 1 wherein said matrix is composed of a material selected from the refractory group consisting of columbium, molybdenum, tantalum, tungsten, nitrides, silicides, carbides and borides.

References Cited by the Examiner

UNITED STATES PATENTS

| | | | |
|---|---|---|---|
| 1,941,768 | 1/34 | Vigne | 308—239 |
| 2,590,761 | 3/52 | Edgar. | |
| 2,602,714 | 7/52 | Wheildon | 308—238 |
| 2,901,380 | 8/59 | Crump | 308—240 |
| 2,961,276 | 11/60 | Wade. | |
| 2,980,473 | 4/61 | Tanis | 308—240 |

DON A. WAITE, *Primary Examiner.*

RICHARD A. DOUGLASS, FRANK SUSKO,
*Examiners.*